(12) United States Patent
Lu

(10) Patent No.: US 7,621,046 B2
(45) Date of Patent: Nov. 24, 2009

(54) MOULDING PROCESS OF COMPOSITE MATERIAL INCLUDING HIGH-THERMAL CONDUCTOR AND ROOM-TEMPERATURE MAGNETIC REFRIGERANT

(75) Inventor: Dingwei Lu, Nanjing (CN)

(73) Assignee: Nanjing University, Nanjing, Jiangsu (CN)

( * ) Notice: Subject to any disclaimer, the term of this patent is extended or adjusted under 35 U.S.C. 154(b) by 705 days.

(21) Appl. No.: 10/519,896

(22) PCT Filed: Jun. 30, 2003

(86) PCT No.: PCT/CN03/00507

§ 371 (c)(1),
(2), (4) Date: Jan. 31, 2005

(87) PCT Pub. No.: WO2004/003100

PCT Pub. Date: Jan. 8, 2004

(65) Prior Publication Data

US 2005/0241134 A1    Nov. 3, 2005

(30) Foreign Application Priority Data

Jul. 1, 2002   (CN) ................................ 02 1 37876
Jul. 1, 2002   (CN) ................................ 02 1 37877
Jul. 15, 2002  (CN) ................................ 02 1 37954

(51) Int. Cl.
*B23P 11/00* (2006.01)
*B23P 25/00* (2006.01)

(52) U.S. Cl. ............... 29/890.039; 29/417; 29/458; 29/527.2; 428/548; 428/615

(58) Field of Classification Search ............. 29/890.03, 29/890.039, 890.042, 412, 417, 458, 505, 29/527.2, 557; 428/846.2, 548, 570, 615, 428/411.1
See application file for complete search history.

(56) References Cited

U.S. PATENT DOCUMENTS

| | | | | |
|---|---|---|---|---|
| 3,205,560 A | * | 9/1965 | Loehlein | 29/890.042 |
| 3,206,839 A | * | 9/1965 | Tranel et al. | 29/890.042 |
| 4,985,072 A | | 1/1991 | Sahashi et al. | |
| 5,124,215 A | * | 6/1992 | Hashimoto | 428/611 |
| 5,979,050 A | * | 11/1999 | Counterman et al. | 29/890.034 |
| 6,826,915 B2 | * | 12/2004 | Wada et al. | 62/3.1 |
| 2001/0032716 A1 | * | 10/2001 | Consilius | 165/80.5 |
| 2002/0182411 A1 | * | 12/2002 | Leonardi et al. | 428/402.2 |

FOREIGN PATENT DOCUMENTS

| | | |
|---|---|---|
| CN | 1090313 A | 8/1994 |
| WO | WO03009314 A1 * | 1/2003 |

* cited by examiner

Primary Examiner—Jermie E Cozart
(74) Attorney, Agent, or Firm—Hudak, Shunk & Farine Co. LPA

(57) ABSTRACT

A molding process of composite material including high-thermal-conductor and room-temperature magnetic refrigerant comprises the steps of nesting magnetic refrigerant with high-thermal-conductor and connecting them mutually, especially making the room-temperature magnetic-thermal-conductor into sheet, strip or filament, inserting the high-thermal-conductors' sheet, strip or filament in the room-temperature magnetic refrigerant's sheet or filament and connecting them fully. This invention has solved the application of the room-temperature magnetic-thermal-conductor, particularly the application of the room-temperature magnetic-thermal-conductor which is lower thermal-conductor, easier oxidation and powdering. The invention utilizes the high thermal-conductor to solve the problem of room-temperature magnetic refrigerant which is poor in conventional heat exchange, meanwhile decreases the loss of the magnetic-thermal effect.

11 Claims, 2 Drawing Sheets

MOULDING PROCESS OF COMPOSITE MATERIAL INCLUDING HIGH-THERMAL CONDUCTOR AND ROOM-TEMPERATURE MAGNETIC REFRIGERANT

1. FIELD OF INVENTION

This invention relates to a molding process of a kind of refrigerant material. It also relates to a method and an apparatus to increase the heat transfer, more specifically, it relates to a molding process of composite material including room temperature magnetic refrigerant material. The process reorganizes the magnetic refrigerant material and high-thermal-conductor to make the composite material. The invention can also be utilized to make the magnetic cold storage material in low temperature chillers.

2. DESCRIPTION OF THE RELATED ARTS

Since around one third of the world's energy is consumed by refrigeration, the progress of refrigeration technology is very important to the survival of human beings. The main refrigeration technologies include evaporation refrigeration, gas expansion refrigeration, absorption refrigeration, thermal electric refrigeration, vortex tube refrigeration, thermal sound refrigeration, pulse tube refrigeration, magnetic refrigeration, etc. The prevalent technology is evaporation refrigeration. This kind of technology requires the use of freon which not only destroys the ozone layer, but also induces the green-house effect. So, refrigeration directly affects the energy consumption and the environment. The research and development of a new type of energy-saving and environment-friendly refrigeration method is becoming imminent and of great significance.

Magnetic refrigeration was confirmed scientifically in 1926. In theory, it has the highest circulation efficiency without a compressor, therefore, it became the dream refrigeration method for many physicists. Unfortunately, the later research and development only succeeded in the ultra low temperature (around absolute zero) and the research and development came to a halt after many failures in room temperature magnetic refrigeration. Differing from the magnetic refrigeration at low temperature, the circulation mode, the magnetic material and magnetic field of room temperature magnetic refrigeration require special consideration and the room temperature magnetic refrigeration is difficult to carry out.

In 1976, Brown of NASA utilized gadolinium plate added with alcohol water mixture as the refrigerant and accomplished a 38° C. temperature difference for the first time in a super-conductive magnetic field. This achievement showed the possibility of room temperature magnetic refrigeration.

In 1982, Barclay and Clayart of the United States proposed the new concept of Active Magnetic Refrigeration (AMR) which laid the theoretical foundation of practical room temperature magnetic refrigeration.

In 1990, the United States Department of Energy sponsored NASA and Ames Laboratory of Iowa State University to develop a room temperature magnetic chiller prototype based on AMR. During the search of material for room temperature magnetic refrigeration, they found that the gadolinium-silicon-germanium alloy has a magnetic-thermal effect much greater than pure gadolinium. After 8 years of hard work on the research of room temperature magnetic chiller, in 1997, the first high efficiency and durable reciprocating type of room temperature magnetic chiller came out. It applied a metal gadolinium ball, with the diameter of 0.1 mm-0.3 mm, as the refrigerant. The refrigerant weighed 3 kilograms. The magnetic field applied was 1.5-5 tesla with the cycle time of 6 seconds. The chiller was operated for 1500 hours. While the chiller was operated in the magnetic field of 5 tesla and 1.5 tesla, its thermal dynamic perfection rate was 60% and 20% respectively. This chiller predicted the coming of a new era of room temperature refrigeration technology.

Room temperature magnetic refrigeration is the way of the future refrigeration. It will inevitably replace the current refrigeration methods. All air conditioners, refrigerators and other types of chillers will be transformed in a revolutionary way. Currently, the primary concern of the room temperature magnetic refrigeration is efficiency, reliability and cost. With the perfection of room temperature magnetic refrigeration technology, the product structure of the refrigeration industry of the world will undergo a significant change and the market potential for room temperature magnetic refrigeration is huge. Since 1997, practical feasibility study of room temperature magnetic refrigeration has started. As the competing and reference standard of room temperature magnetic refrigeration is the conventional steam compressed type refrigeration. It requires that the room temperature magnetic refrigeration must not only be cost effective, but also compact with high operating efficiency. These objectives can be achieved by increasing the operating speed, using room temperature magnetic refrigerant with greater magnetic-thermal effect and increasing the magnetic field intensity. Since technology will continue use fluid to facilitate the heat exchange with the room temperature magnetic refrigerant material, there is the need for molding such material. This invention is directed at the molding process of room temperature magnetic refrigerant material for the room temperature magnetic refrigeration technology.

3. DETAILED DESCRIPTION OF THE INVENTION

This invention provides a molding process and apparatus of composite material including magnetic refrigerant to increase the refrigeration capacity of room temperature magnetic refrigeration, improve the heat transfer, reduce the oxidation rate of the material, and improve its operation life. The purpose of this invention also includes the increase of the refrigeration capacity and efficiency of room temperature magnetic refrigeration by magnification.

Room temperature magnetic refrigerant material is a material with magnetic-thermal effect. Typically it includes gadolinium metal, Dy—Al alloy, Gd—Si—Ge alloy, Mn—Fe—P—As alloy, La—Fe—Si alloy, etc. It also includes the ceramic type of room temperature magnetic-thermal effect material, such as La—Ca—Mn—O material with the structure of Ca—Ti ore and a working temperature of 20-330 K.

The main feature of this invention is to nest a room-temperature magnetic refrigerant material with a high-thermal conductor or vise versa to make the composite material including high-thermal-conductor and room-temperature magnetic refrigerant material.

The high-thermal-conductor in this invention includes artificial crystal, ceramics, etc. Under special circumstances, diamond powder can also be used.

The first method is an embedding method. The room temperature magnetic refrigerant material is processed to tiny balls of appropriate size by cutting, crushing, ball grinding, plasma spray coating and other mechanical processing methods. The minimum size of the balls shall be more than 0.001 mm, and the irregularity of the shape shall be within the scope of this invention. The detailed process is described as follow:

1. The high-thermal-conductor, such as aluminum, copper or silver which has lower melting point than that of the room temperature magnetic refrigerant material, is heated to its melting point and becomes liquid under the vacuum or in the inert atmosphere (no vacuum or inert atmosphere is needed if the conductor's oxidation potential is low), then the room temperature magnetic refrigerant material in the shape of tiny balls is added into the molten high-thermal-conductor. If the melting point of the magnetic refrigerant material is lower than that of the high-thermal-conductor, then the process shall be reversed (processing the high-thermal-conductor into tiny balls and adding them into the molten magnetic refrigerant material).

2. Cool the resulting liquid (usually metal liquid) from step 1 under vacuum or in inert atmosphere to solid. The inner structure of the composite obtained is similar to the inner structure of concrete with cement and rubbles.

3. Machine the solid to particles, such as tiny balls, with various shapes and the diameter of less than 1 mm; sheets with the thickness of less than 1 mm; or filament with diameter of less than 1 mm.

4. If the particle shaped composite material is susceptible to oxidation, a layer of oxidation proof metal may be plated. The resulting composite particles are then placed into the room temperature magnetic chiller and make them compact so that the room temperature magnetic refrigeration can be carried out.

5. If the particles in step 4 are of filament shape, the diameter of the filament shall be more than 0.001 mm.

As another aspect of this invention, the room temperature magnetic refrigerant is made by stacking the sheet units of the room temperature magnetic refrigerant material and creating the salient points between the sheet units to form the liquid path.

The sheet unit described above is comprised of two metal sheets with a liquid thermal conductive agent filled in between. Said liquid thermal conductive agent includes super-paramagnetism and ferromagnetism room temperature magnetic refrigerant particles. Said two metal sheets are divided into several small isolated areas by completely pressing together the two metal sheets at designed points.

The diameter of the super-paramagnetism or ferromagnetism room temperature magnetic refrigerant particles is greater than 0.0001 mm.

The thickness of the said sheets is less than 0.1 mm, and the thickness of sheet units is less than 1 mm or thinner.

The height of the salient points is no more than the thickness of the sheet units.

To ensure the free flow of the liquid in the liquid path between the sheets, a metal powder with the diameter of 0.1-1 mm is spread between the sheets.

The metal sheets described above are copper sheets or other metal sheets with high thermal conductivity.

The thickness of the stacked sheet units is between 1 mm and 100 mm with the fluid path between the sheet units.

The detailed process for making the room temperature magnetic refrigerant is described as follow: crush, ball grind, plasma spray coat or machine the super-paramagnetism or ferromagnetism room temperature magnetic refrigerant material into powder with the particle size not less than 0.0001 mm; prepare the metal sheets of thickness less than 0.1 mm; add the powder into the liquid thermal conductive agent and then seal the agent containing the powder between two metal sheets and compress them to form sheet units of thickness less than 1 mm; divide the compressed sheets into small isolated areas by completely pressing together the sheets at designated points; stack the sheet units; and create salient points between the sheet units to form the liquid paths. The said metal sheets are copper sheets or other metal sheets with high thermal conductivity. The height of the salient points is no more than the thickness of the sheet units. A metal powder with the diameter of 0.1-1 mm is spread between the sheet units. The thickness of the stacked sheet units is between 1 mm and 100 mm.

The molding process of the composite material including room temperature magnetic refrigerant material in this invention also includes:

The room temperature magnetic refrigerant material, such as gadolinium metal and Gd—Si—Ge alloy, is machined to sheets. The thickness of the said sheets or diameter of the said filament is not more than 0.1 mm. A high-thermal-conductor sheet is inserted between the machined sheets of room temperature magnetic refrigerant material to form a sandwich structure.

The thickness of the high-thermal-conductor sheet is in the same order as that of the sheet of the room temperature magnetic refrigerant material and may vary depending on the type of material used.

The full and close contact is required between these two kinds of different sheets so that the heat of the room temperature magnetic refrigerant can be exchanged with the outside through high-thermal-conductor.

Further machine the composite material including room temperature magnetic refrigerant material to balls, sheets or other kinds of shapes. The thickness of the sheet composite material is less than 1 mm or much thinner. The size of other shapes of composite material shall also be less than 1 mm. Before the composite material is installed into the room temperature magnetic refrigerant chiller, it is surface treated to achieve oxidation proof.

Since the thermal conductivity coefficient of the room temperature magnetic refrigerant material, such as gadolinium, is much lower (several dozens times lower) than that of the high-thermal-conductor, the cycle time will be shortened enormously and the unit time refrigeration capacity will be increased significantly if the thermal conductivity coefficient of gadolinium can be increased significantly or the size of the material can be decreased. But there is a limit as to how small the size can be reduced to because the flow resistance of the heat exchange fluid increases significantly as the size decreases. Employing a material of the smallest size possible, we can strengthen the heat transfer design of the material. The new composite material can transfer the heat to the high-thermal-conductor. Although the single magnetic-thermal effect of such composite material is decreased during each cycle, the increase of the refrigeration capacity resulted from the shorter cycle time induced by high thermal conductivity far exceeds the decrease of the refrigeration capacity due to the decrease of the single magnetic-thermal effect. The typical structure of the composite material is shown in FIG. 2.

The advantages of this invention: The basic principle of room temperature magnetic refrigeration is to use the temperature effect of the magnetic material while entering and leaving the magnetic field. Since the temperature effect for each single cycle is relatively small, it is necessary to apply a technology, such as an active mode magnetic cold storage vessel, to magnify and accumulate such temperature effect. By using the active mode magnetic cold storage vessel, the magnetic material also acts as the cold storage vessel in addition to its function of refrigeration. It needs to exchange the heat with the outside to adjust the temperature change of the material.

This invention is also characterized as:
1. Successful application of the room temperature magnetic refrigerant material for room temperature magnetic refrigeration, particularly the application of room temperature magnetic refrigerant material which has low thermal conductivity, is susceptible to oxidation and brittle in room temperature magnetic refrigeration.
2. Isolation of room temperature magnetic refrigerant from the heat exchange fluid to prevent the said refrigerant from being oxidized.
3. Successful application of the high-thermal-conductor to solve the problem of slow heat exchange of room temperature magnetic refrigeration, while minimizing the loss of the magnetic-thermal effect. The high thermal conductivity of the composite material can significantly increase the speed of the refrigeration cycle, and well compensate the negative impact on the refrigeration capacity caused by the decrease of its magnetic-thermal effect. It is very effective to use this material to increase the cycle speed of room temperature magnetic refrigeration. Since the point contact is the conduct mode of the composite material after the molding, under intensified heat transfer (one order of magnitude higher than normal), the heat loss between the high and low temperature source is small

4. BRIEF DESCRIPTION OF DRAWINGS

5. EXAMPLES

Example 1

Figure 1:
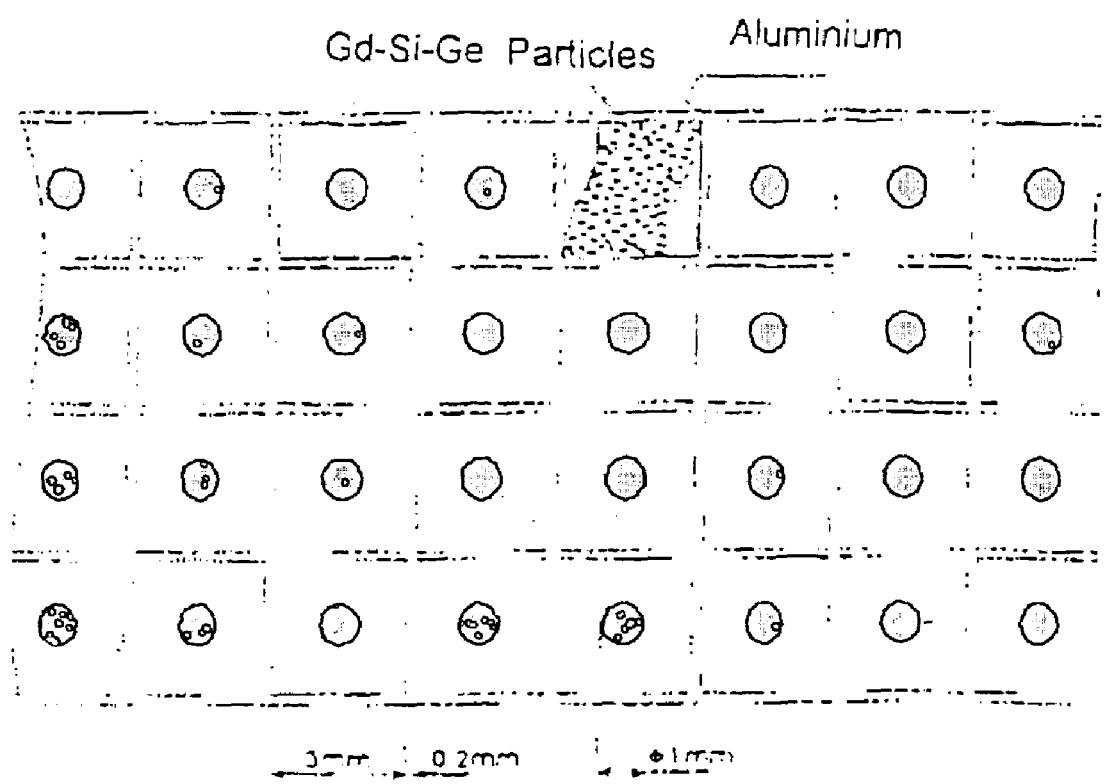
FIG. 1 is the structural representation of the sheet units described in this invention.
Figure 2:
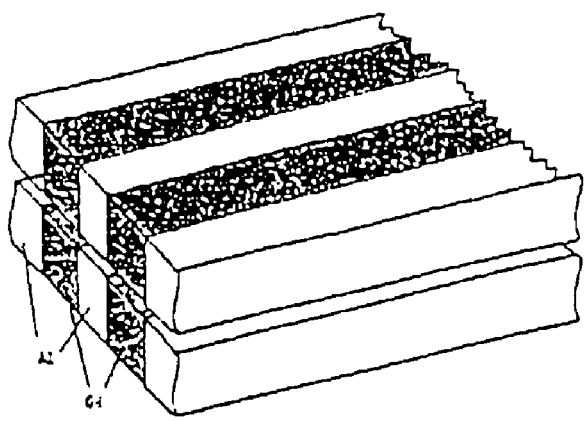
FIG. 2 is the structural representation of the composite sheets described in this invention.
Figure 3:
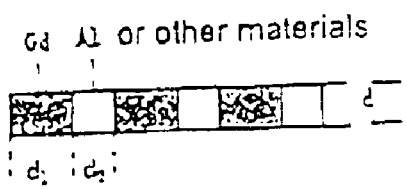
FIG. 3 is the cross section of structural representation of FIG. 2 in this invention.

The room temperature magnetic refrigerant was made by stacking the sheet units of the material which was 0.1 mm thick. The thickness of the stacked units was 5 mm. A truncated cone of 1 mm diameter and 0.05 mm height was inserted between the two sheet units at a 5 mm interval and the fluid path was so obtained. The sheet unit was comprised of two copper sheets of 0.01 mm thickness. A liquid oxidation resistant thermal conductive agent gallium was suffused therebetween. The liquid gallium stated above was dopped with room temperature magnetic refrigerant material gadolinium to form room temperature magnetic refrigerant. The diameter of the refrigerant was 0.005 mm. Impressions were made about every 3 mm between the two copper sheets to form the small isolated areas. The process is described in detail as below:
1. The room temperature magnetic refrigerant material gadolinium was machined into sheets; or crushed with water, ball grinded, plasma spray coated or the room temperature magnetic refrigerant material gadolinium was machined directly into gadolinium balls of suitable size of more than 0.005 mm.
2. Copper sheets of less than 0.01 mm thick were prepared.
3. The room temperature magnetic refrigerant gadolinium balls and oxidation proof thermal conductive agent gallium were sealed between the two copper sheets. The gadolinium balls were packed densely. The material obtained as above was then compressed into a sheet unit with the thickness of 0.1 mm. On the surface of the resulting sheet unit, truncated cones of 1 mm diameter and 0.05 mm height were placed every 5 mm apart. At a 3 mm interval, the copper sheets were pressed together completely to form small isolated areas between the copper sheets.
4. The sheet units were stacked and fixed under pressure so the necessary mechanical strength was obtained. The pressure should not be too high so that a fluid path was obtained. The thickness of the stacked sheet units was 5 mm.
5. The room temperature magnetic refrigerant obtained above was cut to desirable size to be applied in the room temperature magnetic chiller. The structure is shown in FIG. 2 and FIG. 3.

Example 2

The structure and process of making the room temperature magnetic refrigerant was basically the same as described in Example 1, except that the room temperature magnetic refrigerant material used was a super-paramagnetic material with particle size of 0.001 mm; the thickness of the sheet units was 0.05 mm; the spherical metal powders, 0.05 mm in diameter, were dispersed between the sheet units and the thickness of the stacked sheet units was 90 mm.

Example 3

Figure 4:
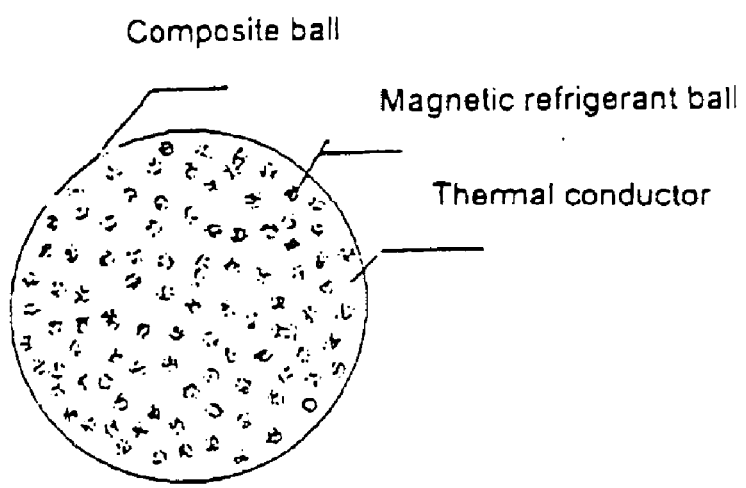
FIG. 4 is structural representation of the composite ball described in this invention.

The room temperature magnetic refrigerant material was gadolinium and the thermal conductive metal was aluminum.
1. The gadolinium was mechanically crushed to balls with appropriate size of 0.025 mm in diameter.
2. The aluminum was melted at 940 K under argon, and then the gadolinium balls obtained from step 1 were placed into the molten aluminum.
3. The aluminum and the gadolinium balls were compressed at 940 K and then cooled down.
4. The material obtained from step 3 was machined or otherwise processed to small balls with 0.25 mm in diameter. It is shown in FIG. 4.

Example 4

As shown in FIG. 2, the molding process of composite material including high-thermal-conductor and room temperature magnetic refrigerant material comprises: cutting the room temperature magnetic refrigerant material such as gadolinium or Gd—Si—Ge alloy into sheets or filaments with section diameter less or much less than 0.1 mm; and the high-thermal-conductor sheets or filaments of the similar size between the room temperature magnetic refrigerant material sheets or filaments were inserted to ensure full and close contact. The process includes: alternately stacking the room temperature magnetic refrigerant material gadolinium or Gd—Si—Ge alloy which were rolled into sheets with copper or aluminum sheets; compressing the stacked sheets; and, cutting them into sheets, strips or filaments. The heat of the room temperature magnetic refrigerant was mainly exchanged with outside through the high-thermal-conductor. As an aspect of this invention, the high-thermal-conductor was aluminum.

It is with difficulties to cut the composite material into sheets. This invention also provides a drilling method to make the end product. The method processes the stacked material into a honeycomb shape. Under the operating condition, heat exchange media flows in the honeycombed holes.

The thickness of gadolinium sheets is 5-100 μm and the thickness of copper sheets is of the same range. Gadolinium sheets alternates with copper sheets while being stacked together. The most optimal mode is to insert a aluminum foil between the gadolinium and copper sheets, compress the sheets and then heat the sheets to 934 K or above to melt the aluminum so that a closer contact between gadolinium and copper sheets can be achieved.

This invention is easy to carry out in the industry.

What is claimed is:

1. A molding process of a composite material including forming a high-thermal conductor and a room temperature magnetic refrigerant material, wherein said room temperature magnetic refrigerant material is nested with said high-thermal-conductor to obtain said composite material; and wherein said room temperature refrigerant material is processed to a shape of particle, sheet, or filament having a diameter or thickness greater than 0.001 mm, and the composite material is in a shape of particle, sheet unit, or filament having a diameter or thickness smaller than 1 mm, wherein the melting point of said high-thermal conductor is lower than that of said room temperature magnetic refrigerant material; melting said high-thermal-conductor under a vacuum or an inert atmosphere; adding said room temperature magnetic refrigerant material to said melted high-thermal conductor; cooling said melted high-thermal conductor containing said room temperature magnetic refrigerant material under a vacuum or inert atmosphere and forming a solid; and machining said solid to small balls having diameters of less than 0.5 mm.

2. The molding process of claim 1, wherein the surface of said balls is plated with a layer of an oxidation proof metal.

3. A molding process of a composite material including forming a high-thermal conductor and a room temperature magnetic refrigerant material, wherein said room temperature magnetic refrigerant material is nested with said high-thermal-conductor to obtain said composite material; and wherein said room temperature refrigerant material is processed to a shape of particle, sheet, or filament having a diameter or thickness greater than 0.001 mm, and the composite material is in a shape of particle, sheet unit, or filament having a diameter or thickness smaller than 1 mm, wherein said composite material is obtained by preparing at least two high-thermal-conductor sheets, adding said room temperature refrigerant material to a liquid thermal conductive agent, sealing said liquid thermal conductive agent containing said magnetic refrigerant material between said at least two high-thermal-conductor sheets and compressing them into sheet units of thickness less than 1 mm; and dividing said sheets into small isolated areas by completely pressing together the said sheet units at designated points.

4. The molding process of claim 3, wherein said room temperature magnetic refrigerant material comprises super-paramagnetism or ferromagnetism room temperature magnetic refrigerant material and is cut, crushed, ball grinded, plasma spray coated or processed by physical or chemical methods to form said particles.

5. The molding process of claim 3, wherein the thickness of said sheets is less than 0.1 mm, and the thickness of said sheet units is less than 0.2 mm.

6. A molding process of a composite material including forming a high-thermal conductor and a room temperature magnetic refrigerant material, wherein said room temperature magnetic refrigerant material is nested with said high-thermal-conductor to obtain said composite material; and wherein said room temperature refrigerant material is processed to a shape of particle, sheet, or filament having a diameter or thickness greater than 0.001 mm, and the composite material is in a shape of particle, sheet unit, or filament having a diameter or thickness smaller than 1 mm, including processing said room temperature magnetic refrigerant material into sheets, strips or filaments; inserting said high-thermal-conductor between said sheets, strips or filaments; and wherein said high-thermal-conductor and said sheets, strips or filaments contact each other closely.

7. The molding process of claim 6, wherein said room temperature magnetic refrigerant material is gadolinium, wherein said high-thermal-conductor is copper; wherein the thickness of a gadolinium sheets is 5-100 µm; wherein the thickness of a copper sheet is 5-100 µm; and wherein said gadolinium sheets and said copper sheets are stacked alternately together.

8. The molding process of claim 6, wherein said room temperature magnetic refrigerant material is gadolinium, wherein said high-thermal-conductor is copper; and inserting an aluminum foil between said gadolinium and said copper sheets; and compressing and heating the resulting stacked sheet to at least 934 K to melt said aluminum foil and to obtain a closer contact between said gadolinium and said copper sheet.

9. The molding process of claim 8, including processing said stacked sheets into honeycombed shape.

10. A process for making a composite material, comprising:
preparing at least two high-thermal-conductor sheets, adding a room temperature refrigerant material to a liquid thermal conductive agent, sealing said liquid thermal conductive agent containing said magnetic refrigerant material between said at least two high-thermal conductor sheets and compressing them into sheet units of thickness less than 1 mm; and dividing said sheets into small isolated areas by completely pressing together said sheet units at designated points; wherein said room temperature refrigerant material is processed to a shape of a particle, sheet, or filament having a diameter or thickness greater than 0.001 mm;
stacking said sheet units and creating salient points between said sheet units to form a liquid path; the height of the salient points being not more than the thickness of the sheet units, spreading a metal powder having a particle size of 0.1 mm to 1 mm between said sheet units; and the thickness of the stacked sheet units being between 1 mm and 100 mm.

11. The process of claim 10, wherein said room temperature magnetic refrigerant material comprises super-paramagnetism or ferromagnetism room temperature magnetic refrigerant material, and said high-thermal-conductor sheets are comprised of copper.

\* \* \* \* \*